United States Patent
Hanley et al.

(10) Patent No.: US 6,818,057 B2
(45) Date of Patent: Nov. 16, 2004

(54) RETARDER FOR CALCIUM SULFOALUMINATE CEMENTS

(75) Inventors: William Hanley, Baltimore, MD (US); Daniel Constantiner, Beachwood, OH (US); Johann Goldbrunner, Woodstock, GA (US)

(73) Assignee: Construction Research & Technology GmbH, Trostberg (DE)

(*) Notice: Subject to any disclaimer, the term of this patent is extended or adjusted under 35 U.S.C. 154(b) by 0 days.

(21) Appl. No.: 10/378,447

(22) Filed: Mar. 3, 2003

(65) Prior Publication Data

US 2003/0233961 A1 Dec. 25, 2003

Related U.S. Application Data

(63) Continuation-in-part of application No. 09/506,818, filed on Feb. 18, 2000, now abandoned.
(60) Provisional application No. 60/122,432, filed on Mar. 2, 1999.

(51) Int. Cl.$^7$ ................................................. C04B 7/32
(52) U.S. Cl. ...................... 106/696; 106/692; 106/695
(58) Field of Search ................................ 106/692, 695, 106/696

(56) References Cited

U.S. PATENT DOCUMENTS

| | | |
|---|---|---|
| 3,860,433 A | 1/1975 | Ost et al. |
| 3,885,985 A | 5/1975 | Serafin et al. |
| 3,964,921 A | 6/1976 | Persinski et al. |
| 3,973,978 A | 8/1976 | Nakagawa et al. |
| 4,028,125 A | 6/1977 | Martin |
| 4,040,854 A | 8/1977 | Persinski et al. |
| 4,054,461 A | 10/1977 | Martin |
| 4,054,462 A | 10/1977 | Stude |
| 4,098,814 A | 7/1978 | Sommer et al. |
| 4,190,454 A | 2/1980 | Yamagisi et al. |
| 4,210,455 A | 7/1980 | Metcalf et al. |
| 4,286,991 A | 9/1981 | Galer et al. |
| 4,286,992 A | 9/1981 | Galer et al. |
| 4,670,055 A | 6/1987 | Koslowski |
| 4,798,628 A | 1/1989 | Mills et al. |
| 5,264,470 A | 11/1993 | Eoff |
| 5,398,759 A | 3/1995 | Rodrigues et al. |
| 5,417,759 A | 5/1995 | Huddleston |
| 5,481,061 A | 1/1996 | Funabashi et al. |
| 5,567,236 A * | 10/1996 | Schapira et al. ............ 106/728 |
| 5,716,448 A | 2/1998 | Furusawa et al. |
| 5,955,452 A | 9/1999 | Zilch et al. |
| 6,136,797 A | 10/2000 | Zilch et al. |

FOREIGN PATENT DOCUMENTS

| | | | |
|---|---|---|---|
| CH | 000686435 A5 | * | 3/1996 |
| DE | 019518469 A1 | * | 11/1996 |
| EP | 000508158 A2 | * | 10/1992 |
| EP | 0579063 A1 | | 1/1994 |
| EP | 000785174 A1 | * | 7/1997 |
| EP | 0856495 A1 | | 8/1998 |
| GB | 1506417 | | 4/1978 |
| GB | 2240334 A | | 7/1991 |
| GB | 2327417 A | | 1/1999 |

OTHER PUBLICATIONS

Derwent Publication, WPI Acc. No. 94–333910/199442 English language abstract for DE 4313148A, Oct. 1994.
Derwent Publication, WPI Acc. No. 73–37905U/197327 English language abstract for FR 2153756A, Jul. 1973.
Derwent Publication, WPI Acc. No. 90–005317/199001 English language abstract for JP 88116922A, Nov. 1989.
Derwent Publication, WPI Acc. No. 84–209568/198434 English language abstract for JP 82226913A, Jul. 1984.
Derwent Publication, WPI Acc. No. 94–043140/0199405 English language abstract for ZA 922137A, Nov. 1993.
Derwent Publication, WPI Acc. No. 86–096825/198615 English language abstract for JP 61040854A, Feb. 1986.

* cited by examiner

Primary Examiner—Anthony J. Green
(74) Attorney, Agent, or Firm—Renner Kenner Greive Bobak Taylor & Weber

(57) ABSTRACT

When hydrated, calcium sulfoaluminate cements form ettringite. A retarder which retards this reaction is at least one of phosphono alkyl carboxylic acid and a salt of a phosphono alkyl carboxylic acid. Additionally, the retarder can comprise at least one of a carboxylic acid and a salt of a carboxylic acid. The retarder can be prepared as an admixture for addition to cement, or the retarder can be included in a cementitious formulation. Also, other cements, such as portland cement, can be included with the calcium sulfoaluminate cementitious formulation. A method of retarding the set of a calcium sulfoaluminate cementitious formulation without substantially reducing achievable compressive strength, comprises providing in the cementitious formulation, a retarder comprising a component being at least one of phosphono alkyl carboxylic acid and a salt of a phosphono alkyl carboxylic acid.

36 Claims, 2 Drawing Sheets

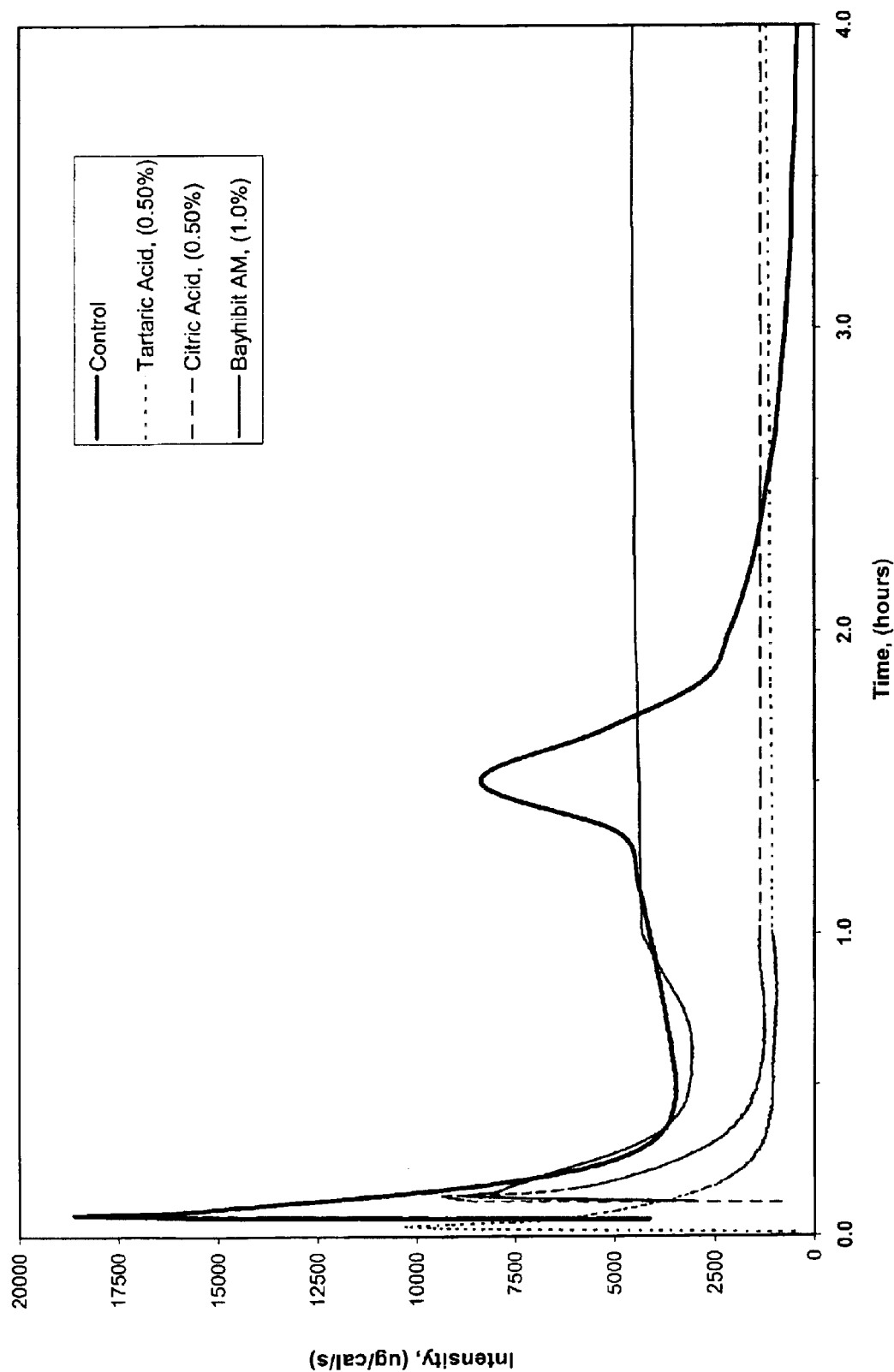

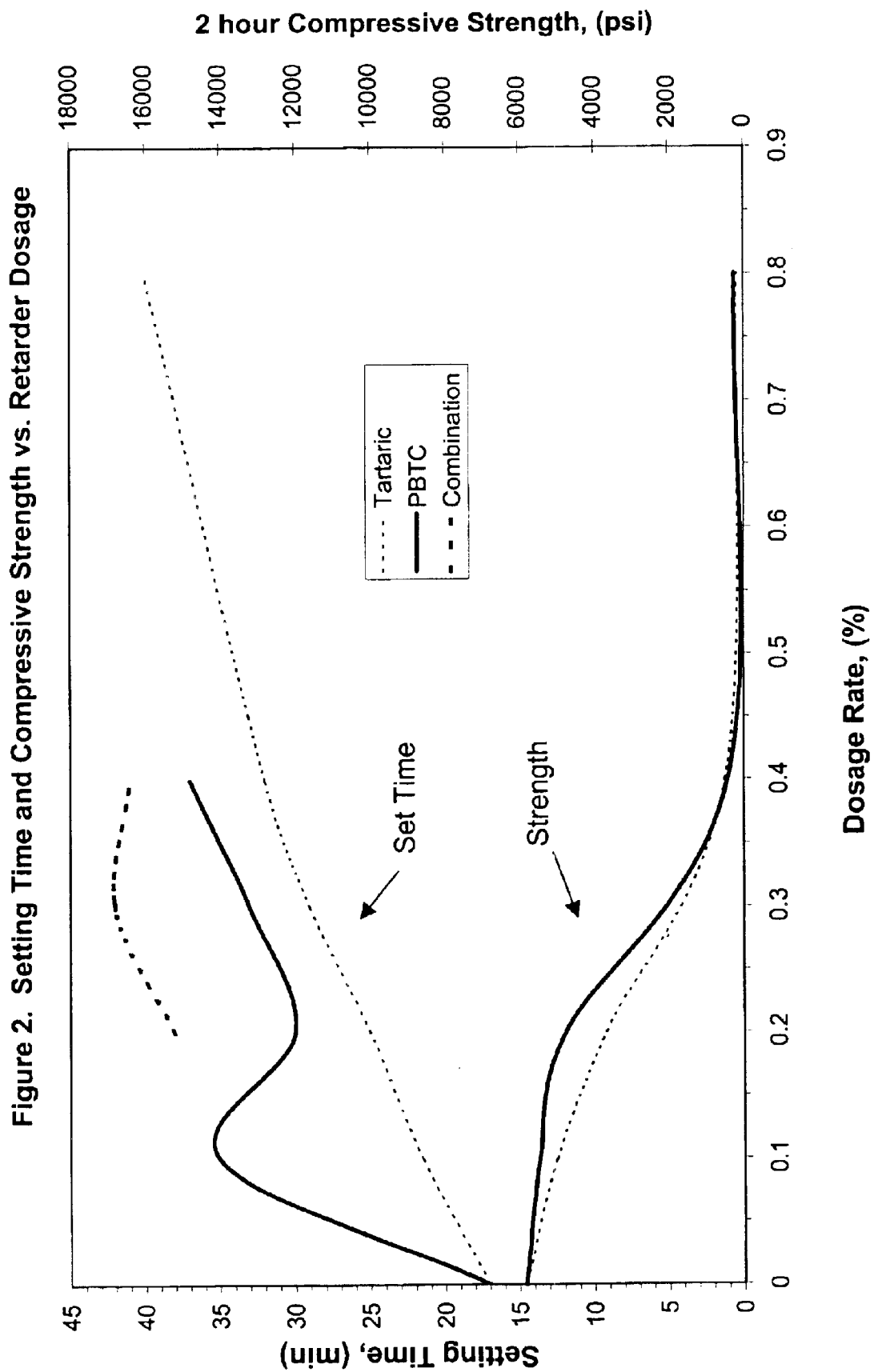
Figure 2. Setting Time and Compressive Strength vs. Retarder Dosage

RETARDER FOR CALCIUM SULFOALUMINATE CEMENTS

CROSS-REFERENCE TO RELATED APPLICATIONS

The present application is a continuation-in-part of U.S. Ser. No. 09/506,818 filed Feb. 18, 2000 now abandoned, which claims priority from U.S. Provisional Application No. 60/122,432 filed Mar. 2, 1999.

BACKGROUND

Calcium sulfoaluminate (CSA) cements generally comprise cements containing the components $4CaO \cdot 3Al_2O_3 \cdot SO_3$, $CaSO_4$, and $CaO$. When CSA cements are hydrated, ettringite is formed by the following reaction:

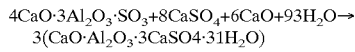

The formation of ettringite is very fast. This reaction provides for high early compressive strength of a cementitious formulation; however, this reaction causes the loss of workability of the cementitious formulation. To slow down the reaction and provide increased workability, retarders have been added to slow the hydration reaction in CSA cements. Typically, the retarders chelate the calcium and thus slow the hydration reaction.

U.S. Pat. No. 3,860,433 to Ost et al. discloses sucrose, boric acid, or mucic acid as retarders for calcium sulfoaluminate cements.

U.S. Pat. No. 3,973,978 to Nakagawa et al. discloses a calcium aluminate cement in combination with an organic sulfate that is retarded by organic carboxyic acids, such as gluconic acid, tartaric acid, salicylic acid, citric acid, malic acid, and the sodium, potassium, or lithium salts these acids either alone or in combination with a carbonate or a hydroxide.

U.S. Pat. No. 4,190,454 to Yamagisi et al. discloses a calcium aluminate cement in combination with an organic sulfate that is retarded by a combination of carboxylic acids with an alkali carbonate. The retarder composition being i) gluconic acid and/or tartaric acid and/or s water soluble salt thereof; ii) citric acid and or an alkali salt therof; and iii) an alkali carbonate.

U.S. Pat. Nos. 4,286,992 and 4,286,991 to Galer et al. disclose a retarder for calcium sulfoaluminate cements being a hydroxy polycarboxylic acid in combination with either sucrose or a starch hydrolyzate. The hydroxy polycarboxylic acids can be citric acid, tartaric acid, malic acid or mucic acid.

U.S. Pat. No. 4,670,055 to Koslowski discloses a retarder for calcium sulfoaluminate cements that is a combination of calcium sulfate with an organic setting retarder for aluminate, such as a hydroxy carboxylic acid, such as citric acid, tartaric acid, or malic acid.

U.S. Pat. No. 4,798,628 to Mills et al. discloses a modified formulation of a calcium sulfoaluminate cement. This cement can be retarded with citric acid.

U.S. Pat. No. 5,481,061 to Funabashi et al. discloses improving the fluidity of a calcium sulfoaluminate cement by incorporation of a hydrophilic material, such as a salt of a polybasic carboxylic acid.

JP 1289890 discloses a calcium sulfoaluminate and portland cement mixture that is retarded with a hydroxycarboxylic acid or its salt, such as citric acid.

EP 856495 discloses a gypsum and ettringite cement that can optionally contain a retarder being tartaric acid with up to 2 wt. % calcium hydroxide.

EP 579063 discloses a calcium sulfoaluminate and calcium silicate cement that contains a calcium sulfoaluminate cement retarder being a hydroxy carboxylic acid, such as tartaric acid or citric acid, or it water-soluble salts.

GB 1506417 discloses a calcium sulfoaluminate cement retarded by boric acid, carboxylic acids, such as citric acid or alpha-ketoglutaric acid, keratin, or cellulose.

While it has been known to use carboxylic acids, such as citric acid or tartaric acid, for retarders in calcium sulfoaluminate cements, these carboxylic acids require a large dose to be effective at retarding the reaction. At higher doses, not only is the set retarded, but the compressive strength of a resulting cement is reduced. Increased workability is achieved at the cost of decreased compressive strength.

To overcome the problems with decreased compressive strength, carboxylic acids have been used in combination with other additives to recapture some of the lost compressive strength. U.S. Pat. No. 4,190,454, U.S. Pat. No. 4,286,991, U.S. Pat. No. 4,286,992, U.S. Pat. No. 4,670,055, and EP 579063 above disclose combinations that try to recapture the compressive strength.

It has also been known to use phosphono butane tricarboxylic acids and phosphono aliphatic carboxylic acids as set retarders (U.S. Pat. No. 5,398,759 to Rodrigues et al.) and flow improvement aids (U.S. Pat. No. 4,040,854 to Persinski et al.) for oil and gas well cements. However, the use of phosphono alkyl carboxylic acids as a retarder for calcium sulfoaluminate cements has not been previously known.

What is needed in the industry is a set retarder for calcium sulfoaluminate cements that retards the set of the cement without a significant reduction in the compressive strength of a resulting cement.

It is therefore desirable to provide an admixture that retards the hydration of calcium sulfoaluminate cements without a significant reduction in the compressive strength of the cement.

It is also desirable to provide a calcium sulfoaluminate cement formulation containing a retarder that retards the hydration of the calcium sulfoaluminate cement without a significant reduction in the compressive strength of the cement.

SUMMARY

A cementitious formulation is provided comprising a calcium sulfoaluminate cement and a retarder, that develops a 2 hour compressive strength greater than about 2000 pounds per square inch, wherein the retarder comprises a component being at least one of a phosphono alkyl carboxylic acid and a salt of a phosphono alkyl carboxylic acid. Additionally, the retarder can comprise at least one of a carboxylic acid and a salt of a carboxylic acid.

Also provided is a method of retarding the set of a calcium sulfoaluminate cementitious formulation without substantially reducing achievable compressive strength, comprising providing in said cementitious formulation, a retarder comprising a component being at least one of a phosphono alkyl carboxylic acid and a salt of a phosphono alkyl carboxylic acid, and wherein the calcium sulfoaluminate cementitious formulation comprises a calcium sulfoaluminate cement; and adding water to said cementitious formulation to cause the cementitious formulation to set, developing a 2-hour compressive strength of greater than about 2000 pounds per square inch.

BRIEF DESCRIPTION OF THE DRAWINGS

FIG. 1 is a graph comparing the retarding properties of selected retarders for calcium sulfoaluminate cements.

FIG. 2 is a graph of setting time versus dosage of the retarder and a graph of the two hour compressive strength versus dosage of the retarder.

DETAILED DESCRIPTION

For simplification in writing, as used herein, the term acid/salt refers to the acid and/or the salt form of the chemical.

A set retarding admixture for calcium sulfoaluminate cements is provided which comprises a component that is at least one of a phosphono alkyl carboxylic acid and a salt of a phosphono alkyl carboxylic acid that develops a 2 hour compressive strength greater than about 2000 pounds per square inch in a cementitious formulation.

The salts of the phosphono alkyl carboxylic acid include but are not limited to lithium, sodium, potassium, magnesium, calcium, ammonium, and mixtures thereof.

The phosphono alkyl carboxylic acid/salt may comprise 2-phosphono-1,2,4-butane tricarboxylic acid (PBTC).

The phosphono alkyl carboxylic acid has the general structure shown below:

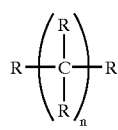

wherein R is —H,

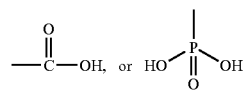

and n is an integer from 3 to 6, with the proviso that at least one R is the PO(OH)$_2$.

The 2-phosphono-1,2,4-butane tricarboxylic acid may be represented by the following structure:

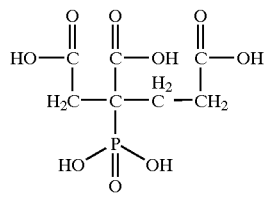

The set retarding admixture further comprises a second component that is at least one of a carboxylic acid and a salt of a carboxylic acid. The carboxylic acids according to the invention generally have a 1 to 8 carbon atom backbone. The preferred carboxylic acids have 3 to 4 carbon atoms in the backbone. Suitable carboxylic acids according to the present invention include, but are not limited to, tartaric acid, citric acid, glutamic acid, glutaric acid, glycolic acid, formic acid, gluconic acid, and mixtures thereof. The carboxylic acids may comprise hydroxy carboxylic acids.

The salts of the carboxylic acids include, but are not limited to, lithium, sodium, potassium, magnesium, and calcium salts of the previously referenced carboxylic acids.

We have found that the acid form of the phosphono alkyl carboxylic acid or the carboxylic acids is generally more effective at retarding the calcium sulfoaluminate cement than are the corresponding salts.

When the tartaric acid/salt is used in combination with the PBTC acid/salt, the effective ratio of the tartaric acid/salt to the PBTC acid/salt in the retarder according to the present invention ranges from greater than 0 to about 5 based on weight, and from greater than 0 to about 2.8 based on molar ratio. A preferred ratio of the carboxylic acid/salt to the PBTC acid/salt is about 2 to 1.

A cementitious formulation is provided which comprises a calcium sulfoaluminate cement and a retarder that develops a 2 hour compressive strength greater than about 2000 pounds per square inch, wherein the retarder comprises a component being at least one of a phosphono alkyl carboxylic acid and a salt of a phosphono alkyl carboxylic acid. The salt of phosphono alkyl carboxylic acid is selected from the group consisting of lithium, sodium, potassium, magnesium, calcium, ammonium, and mixtures thereof.

The phosphono alkyl carboxylic acid may comprise 2-phosphono-1,2,4-butane tricarboxylic acid.

The retarder is present in the cementitious formulation in an effective amount from greater than 0% to about 1% based on the dry weight of the calcium sulfoaluminate cement. Preferably, the retarder is present in an amount of from about 0.2% to about 0.8% based on the dry weight of the calcium sulfoaluminate cement.

The retarder in the cementitious formulation of the present invention can further comprise a second component that is at least one of a carboxylic acid and a salt of a carboxylic acid. As stated above, the carboxylic acids generally have a 1 to 8 carbon atom backbone, and preferred carboxylic acids have 3 to 4 carbon atoms in the backbone. Suitable carboxylic acids according to the present invention include, but are not limited to, tartaric acid, citric acid, glutamic acid, glutaric acid, glycolic acid, formic acid, gluconic acid, and mixtures thereof. The carboxylic acids may be hydroxy carboxylic acids.

The salts of the carboxylic acids according to the present invention include, but are not limited to, lithium, sodium, potassium, magnesium, and calcium salts of the previously referenced carboxylic acids.

The phosphono alkyl carboxylic acid/salt component of the retarder is present in the cementitious formulation in an effective amount from greater than 0% to about 0.4% based on the dry weight of the calcium sulfoaluminate cement. Preferably, the phosphono alkyl carboxylic acid/salt component is present in an amount from about 0.05% to about 0.3% based on the dry weight of the calcium sulfoaluminate cement.

The carboxylic acid/salt component is present in the cementitious formulation in an effective amount from greater than 0% to about 0.7% based on the dry weight of the calcium sulfoaluminate cement. Preferably, the carboxylic acid/salt is present in an amount from about 0.1% to about 0.6% based on the dry weight of the calcium sulfoaluminate cement. When tartaric acid is the carboxylic acid, it is preferred that the tartaric acid be present in an amount from 0.17% to 0.5% based on the dry weight of the calcium sulfoaluminate cement.

The effectiveness of each specific carboxylic acid is different and is based upon its ability to chelate calcium. In the present invention, the following carboxylic acids are listed in the order of most effective to least effective: tartaric acid, citric acid, glutamic acid, glutaric acid, glycolic acid, formic acid, and gluconic acid. One skilled in the art would be able to determine the actual effective dose for each specific carboxylic acid.

The amount of phosphono alkyl carboxylic acid/salt is preferably kept low because of its low threshold value. The threshold value is the minimum amount needed to be effective. Carboxylic acids/salts have a higher threshold value as compared to a phosphono alkyl carboxylic acid/salt. When carboxylic acids/salts are used alone at high levels, not only is the cement retarded, but also, the compressive strength of a resulting cement is reduced. By using phosphono alkyl carboxylic acid/salt alone or in combination with a carboxylic acid/salt, the overall effective dose of the combination is lower than the effective dose of the carboxylic acid/salt alone, which results in retardation of the calcium sulfoaluminate cement without a significant reduction in the compressive strength of a resulting cement.

Further, when phosphono alkyl carboxylic acid/salt is used in combination with a carboxylic acid/salt, the retardation of the calcium sulfoaluminate cement is greater than the retardation when phosphono alkyl carboxylic acid/salt or the carboxylic acid/salt is used alone. Also, the combination provides a level of retardation beyond what would be expected of the combination, additively. Specifically, FIG. 2 shows that the combination of the phosphono alkyl carboxylic acid/salt and the carboxylic acid/salt provides for a longer set time than when either is used alone.

In comparison, it has also been found that conventional chelators, such as hydroxyethylidenediphosphonic acid (HEDP) and ethylenediaminetetraacetic acid (EDTA) have no ability to retard the formation of ettringite in calcium sulfoaluminate cements.

The cementitious formulation may further comprise other cements used in combination with the calcium sulfoaluminate cement. Examples of these other cements include, but are not limited to, portland, pozzolanic, and mixtures thereof. These other cements can replace up to about 70 to 80% of the calcium sulfoaluminate cement, without altering the effect of the retarder.

Calcium sulfoaluminate cements are largely comprised of a mineral called yeelemite (or, calcium sulfo-aluminate). During its hydration, it primarily produces a sulfur containing mineral called ettringite—3 $(CaO \cdot Al_2O_3 \cdot 3CaSO4 \cdot 31H_2O)$. This produces cements which have expansive qualities and very rapid strength development. It is possible to get a similar type of behavior using blends of calcium aluminate (CA) and portland cements (PC); however, one needs to add sulfate to the system to get a comparable amount of expansion. In essence, one would be formulating a combination of materials to mimick the calcium sulfoaluminate cement.

The cementitious formulation may further comprise aggregate. Examples of aggregate include, but are not limited to, silica, quartz, crushed round marble, glass spheres, granite, limestone, calcite, feldspar, alluvial sands, any other sands, any other durable aggregate, and mixtures thereof.

The cementitious formulation may additionally comprise any cement additive that does not adversely affect the advantageous results obtained by the present invention. Examples of additives include, but are not limited to, dispersants, defoaming agents, air-entraining or air detraining agents, corrosion inhibitors, water reducing agents, pigments, and mixtures thereof.

The cementitious formulation is activated upon the addition of water. The water to cement ratio (W/C) generally ranges from about 0.28 to about 0.5 based on the dry weight of all cements in the cementitious formulation.

A method of retarding the set of a calcium sulfoaluminate cementitious formulation is provided which does not substantially reduce achievable compressive strength. The method includes providing in the cementitious formulation, a retarder comprising at least one of a phosphono alkyl carboxylic acid and a salt of a phosphono alkyl carboxylic acid. The calcium sulfoaluminate cementitious formulation comprises a calcium sulfoaluminate cement and may contain other cements, aggregates, and additives that do not adversely affect the advantageous results obtained by the present invention. Water is added to the calcium sulfoaluminate cementitious formulation to cause the formulation to set, developing a 2-hour compressive strength of greater than about 2000 pounds per square inch.

The phosphono alkyl carboxylic acid may comprise 2-phosphono-1,2,4-butane tricarboxylic acid.

The retarder in the method may further comprise a second component that is at least one of a carboxylic acid and a salt of a carboxylic acid, as described above.

EXAMPLES

Example 1

A comparison of set retarders was performed. The set of a control mixture of calcium sulfoaluminate cement was compared to calcium sulfoaluminate cement mixtures containing tartaric acid at 0.5%, citric acid at 0.5%, and 2-phospono-1,2,4-butane tricarboxylic acid (BAYHIBIT AM from Bayer Corporation, Pittsburgh, Pa.) at 1% based on the dry weight of the calcium sulfoaluminate cement. The calcium sulfoaluminate cement used was sold under the trademark ULTIMAX from Ultimax Corp., Huntington Beach, Calif. The results of the comparison, determined by calorimetry, are shown in FIG. 1. The units of measurement in FIG. 1 are $\mu$g/calorie/second which is proportional to the heat of hydration of the samples.

As shown in FIG. 1, it can be seen that all three acids reduce the intensity, but not the sharpness of the first major peak of the pure calcium sulfoaluminate cement. This peak is theorized to indicate the heat release due to the setting of the cement. The second peak in the curve is more rounded and is theorized to indicate an increase in strength development. In all cases, the acids reduce the intensity of this curve and significantly broaden the curve out. The tartaric acid and citric acid behave comparably, while the height for the PBTC curve is maintained over a greater time. It is theorized that this is why PBTC has higher strength development for a given retardation.

Example 2

Mixtures of calcium sulfoaluminate cements were prepared with various combinations of the retarders of the present invention. The setting time and the 2 hour compressive strength were measured.

| Cementitious Formulation | |
|---|---|
| Calcium Sulfoaluminate Cement (ULTIMAX) | 1600 g (32%) |
| Dry Sand | 3400 g (68%) |
| water | 480 ml |
| water to cement ratio | 0.3 |

Components added by weight percent of dry cement

Component A: 2-phospono-1,2,4-butane tricarboxylic acid

Component B: Tartaric Acid

The results of the above mixtures are listed below in Table 1.

TABLE 1

| Mix Number | Component (wt. %) (A) | (B) | Setting Time (min) | 2 Hour Compressive Strength (psi) |
|---|---|---|---|---|
| 1 | 0.0 | 0.0 | 17 | 5830 |
| 2 | 0.1 | 0.0 | 35 | 5460 |
| 3 | 0.4 | 0.0 | 38 | 430 |
| 4 | 0.0 | 0.2 | 25 | 3770 |
| 5 | 0.0 | 0.8 | 40 | 170 |
| 6 | 0.2 | 0.1 | 40 | 2808 |
| 7 | 0.1 | 0.2 | 41 | 2928 |

Example 3

The dosages of PBTC, tartaric acid, and the combination of PBTC with tartaric acid were varied to determine the set time of a calcium sulfoaluminate cement. ULTIMAX cement was used. Also, the 2 hour compressive strength of the mixture with PBTC and the mixture with tartaric acid was measured. The results are shown in FIG. 2.

As is shown in FIG. 2, as the dosage of retarder increases, the 2 hour compressive strength decreases showing that the mixture is retarded and not yet fully set.

Testing was done to determine the C-191 Set Time and 2 hour C-109 Compressive Strength of the calcium sulfoaluminate cementitious formulation of the present invention with and without the addition of soil. The soil had a minus #170 mesh sieve fraction of 10.2%. Three mixtures were prepared. Mixture 8 which corresponds to Mixture Number 2 in Table 1 of the present application which contained 32 wt. % (1600 g) calcium sulfoaluminate cement, 68 wt. % (3400 g) dry sand, 480 ml water, and 0.1 wt. % 2-phosphono-1,2,4-butane tricarboxylic acid. Mixtures 9 and 10 had the same mixture proportions as Mixture 8 but the dry sand was partially replaced with soil. The results of the tests are set forth in Table II below:

TABLE II

| Mixture | % of Sand Replaced With Soil | Added Water | Set Time | 2 Hour Compressive Strength (psi) |
|---|---|---|---|---|
| 8 | 0 | 720 ml | 9 minutes | 3020 |
| 9 | 25% | 835 ml | 17 minutes | 1930 |
| 10 | 50% | 960 ml | 10 minutes | 800 |

The basic performance and physical characteristics of the cementitious composition of the present invention changes when dry sand is replaced with soil. There is a marked reduction in compressive strength—3,020 pounds per square inch (psi) in Mixture 1 without soil compared to 1,930 psi and 800 psi when sand was replaced with soil. The reduction in compressive strength is coupled with a decrease in workability as compared to the calcium sulfoaluminate cementitious formulation of the present invention. The results of the testing offer evidence that the addition of soil to the calcium sulfoaluminate cementitious formulation of the present invention materially affects the invention by reducing the compressive strength.

Example 4

Testing was done to show the different set characteristics of calcium aluminate cement and calcium sulfo-aluminate cement.

Cementitious mixtures were prepared using calcium sulfo-aluminate cement and calcium aluminate cement.

Mixture #1

500 grams calcium sulfo-aluminate cement
500 grams Type I/II portland cement
1000 grams silica sand
500 mL water Mixture #2

500 grams calcium aluminate cement
500 grams Type I/II portland cement
1000 grams silica sand
500 mL water Each mixture was mixed for 3 minutes in a N50 Hobart mixer at speed #1.

The results are as follows:

| | Flow at 15 drops | Initial Set | 2 Hour Strength |
|---|---|---|---|
| Mixture #1 | 150% | 47 minutes | 800 psi |
| Mixture #2 | 148% | 2 hours 34 minutes | N/A |

Flow at 15 drops: ASTM C 1147
Initial Set: ASTM C 266
2 hour compressive strength: ASTM C 109

The results demonstrate that the set characteristics of calcium sulfo-aluminate cement mixtures and calcium aluminate cement mixtures differ. While the flow for each mixture is comparable, the setting and strength gain characteristics for the mixtures are markedly different. While it is possible to adjust the relative amounts of the cements in the formulas to "optimize" for a certain physical performance property, it is not possible to merely mix calcium aluminate cement with portland cement and achieve the same characteristics as with calcium sulfo-aluminate cement. Even utilizing different proportions of starting materials to attempt to mimic the other system, the sulfate available in portland cement is not sufficient to enable a calcium aluminate cement to achieve the same properties as a calcium sulfoaluminate cement.

It should be appreciated that the present invention is not limited to the specific embodiments described above, but includes variations, modifications and equivalent embodiments defined by the following claims. The embodiments disclosed alone are not necessarily in the alternative, as various embodiments of the invention may be combined to provide desired characteristics or results.

What is claimed is:

1. A cementitious formulation comprising a calcium sulfoaluminate cement and a retarder, that develops a 2 hour compressive strength greater than about 2000 pounds per square inch, wherein the retarder comprises a component being at least one of a phosphono alkyl carboxylic acid and a salt of a phosphono alkyl carboxylic acid, and wherein the phosphono alkyl carboxylic acid has the general structure shown below:

and n is an integer from 3 to 6, with the proviso that at least one R is the $PO(OH)_2$.

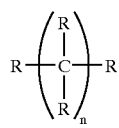

wherein R is —H,

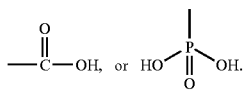

2. The cementitious formulation of claim 1, wherein the 2 hour compressive strength is greater than about 2800 pounds per square inch.

3. The cementitious formulation of claim 1, wherein the component is present in an amount from greater than 0% to about 0.4% based on the dry weight of the calcium sulfoaluminate cement.

4. The cementitious formulation of claim 1, wherein the phosphono alkyl carboxylic acid is 2-phosphono-1,2,4-butane tricarboxylic acid.

5. The cementitious formulation of claim 1, wherein the salt of phosphono alkyl carboxylic acid is selected from the group consisting of lithium, sodium, potassium, magnesium, calcium, ammonium, and mixtures thereof.

6. The cementitious formulation of claim 1, wherein the retarder further comprises a second component that is at least one of a carboxylic acid and a salt of a carboxylic acid.

7. The cementitious formulation of claim 6, wherein the 2 hour compressive strength is greater than about 2800 pounds per square inch.

8. The cementitious formulation of claim 6, wherein the carboxylic acid is selected from the group consisting of tartaric acid, citric acid, glutamic acid, glutaric acid, glycolic acid, formic acid, gluconic acid, and mixtures thereof, and wherein the salt of a carboxylic acid is selected from the group consisting of a salt of tartaric acid, a salt of citric acid, a salt of glutamic acid, a salt of glutaric acid, a salt of glycolic acid, a salt of formic acid, a salt of gluconic acid, and mixtures thereof.

9. The cementitious formulation of claim 8, wherein the salt of any of tartaric acid, citric acid, glutamic acid, glutaric acid, glycolic acid, formic acid, gluconic acid is selected from the group consisting of lithium, sodium, potassium, magnesium, calcium, ammonium, and mixtures thereof.

10. The cementitious formulation of claim 6, wherein the second component is present in an amount from greater than 0% to about 0.7% based on the dry weight of the calcium sulfoaluminate cement.

11. The cementitious formulation of claim 6, wherein the weight ratio of the second component to the component ranges from greater than 0 to about 5.

12. The cementitious formulation of claim 1 further comprising water, and wherein the ratio of water to the cement ranges from about 0.28 to about 0.5 based on the dry weight of the cement.

13. The cementitious formulation of claim 1 further comprising an additional cement selected from the group consisting of portland, pozzolonic, and mixtures thereof.

14. The cementitious formulation of claim 6 further comprising water, and wherein the ratio of water to the cement ranges from about 0.28 to about 0.5 based on the dry weight of the cement.

15. The cementitious formulation of claim 6 further comprising an additional cement selected from the group consisting of portland, pozzolonic, and mixtures thereof.

16. The cementitious formulation of claim 1 further comprising aggregate.

17. The cementitious formulation of claim 6 further comprising aggregate.

18. The cementitious formulation of claim 6, wherein the component is 2-phosphono-1,2,4-butane tricarboxylic acid and is present in an amount of from about 0.08% to about 0.25% based on the dry weight of the calcium sulfoaluminate cement, and wherein the second component is tartaric acid and is present in an amount from about 0.17% to about 0.5% based on the dry weight of the calcium sulfoaluminate cement.

19. A method of retarding the set of a calcium sulfoaluminate cementitious formulation without substantially reducing achievable compressive strength, comprising providing in said cementitious formulation, a retarder comprising a component being at least one of a phosphono alkyl carboxylic acid and a salt of a phosphono alkyl carboxylic acid, and wherein the calcium sulfoaluminate cementitious formulation comprises a calcium sulfoaluminate cement, and wherein the phosphono alkyl carboxylic acid has the general structure shown below:

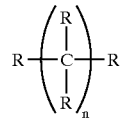

wherein R is —H,

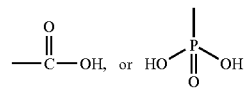

and n is an integer from 3 to 6, with the proviso that at least one R is the PO(OH)$_2$;

and adding water to said cementitious formulation to cause the cementitious formulation to set, developing a 2-hour compressive strength of greater than about 2000 pounds per square inch.

20. The method of claim 19, wherein the 2 hour compressive strength is greater than about 2800 pounds per square inch.

21. The method of claim 19, wherein the component is present in an amount from greater than 0% to about 0.4% based on the dry weight of the calcium sulfoaluminate cement.

22. The method of claim 19, wherein the phosphono alkyl carboxylic acid is 2-phosphono-1,2,4-butane tricarboxylic acid.

23. The method of claim 19, wherein the salt of phosphono alkyl carboxylic acid is selected from the group consisting of lithium, sodium, potassium, magnesium, calcium, ammonium, and mixtures thereof.

24. The method of claim 19, wherein the retarder further comprises a second component that is at least one of a carboxylic acid and a salt of a carboxylic acid.

25. The method of claim 24, wherein the 2 hour compressive strength is greater than about 2800 pounds per square inch.

26. The method of claim 24, wherein the carboxylic acid is selected from the group consisting of tartaric acid, citric acid, glutamic acid, glutaric acid, glycolic acid, formic acid, gluconic acid, and mixtures thereof, and wherein the salt of a carboxylic acid is selected from the group consisting of a salt of tartaric acid, a salt of citric acid, a salt of glutamic acid, a salt of glutaric acid, a salt of glycolic acid, a salt of formic acid, a salt of gluconic acid, and mixtures thereof.

27. The method of claim 26, wherein the salt of any of tartaric acid, citric acid, glutamic acid, glutaric acid, glycolic acid, formic acid, gluconic acid is selected from the group consisting of lithium, sodium, potassium, magnesium, calcium, ammonium, and mixtures thereof.

28. The method of claim 24, wherein the second component is present in an amount from greater than 0% to about 0.7% based on the dry weight of the calcium sulfoaluminate cement.

29. The method of claim 27, wherein the ratio of the second component to the component ranges from greater than 0 to about 5.

30. The method of claim 19 further comprising adding water to the calcium sulfoaluminate cementitious formulation, and wherein the ratio of water to the cement ranges from about 0.28 to about 0.5 based on the dry weight of the cement.

31. The method of claim 19 wherein the calcium sulfoaluminate cementitious formulation further comprises an additional cement selected from the group consisting of portland, pozzolanic, and mixtures thereof.

32. The method of claim 24 further comprising adding water to the calcium sulfoaluminate cementitious formulation, and wherein the ratio of water to the cement ranges from about 0.28 to about 0.5 based on the dry weight of the cement.

33. The method of claim 24 wherein the calcium sulfoaluminate cementitious formulation further comprises an additional cement selected from the group consisting of portland, pozzolanic, and mixtures thereof 34. The method of claim 19 wherein the calcium sulfoaluminate cementitious formulation further comprises aggregate.

35. The method of claim 24 wherein the calcium sulfoaluminate cementitious formulation further comprises aggregate.

36. The method of claim 24, wherein the component is 2-phosphono-1,2,4-butane tricarboxylic acid and is present in an amount of from about 0.08% to about 0.25% based on the dry weight of the calcium sulfoaluminate cement, and wherein the second component is tartaric acid and is present in an amount from about 0.17% to about 0.5% based on the dry weight of the calcium sulfoaluminate cement.

* * * * *